United States Patent Office 3,161,647
Patented Dec. 15, 1964.

---

3,161,647
PIPERIDONES
Rolf Denss and Hans Herbert Kühnis, Basel, and Conrad Hans Eugster, Wallisellen, near Zurich, Switzerland, assignors to Geigy Chemical Corporation, Ardsley, N.Y., a corporation of Delaware
No Drawing. Filed Nov. 27, 1962, Ser. No. 240,456
Claims priority, application Switzerland Dec. 5, 1961
10 Claims. (Cl. 260—294.7)

The present invention concerns a new process for the production of hydrogenated pyridones as well as the new compounds obtained by this process which have valuable pharmacological properties.

Compounds of the formula $$\begin{array}{c} R_3 \quad OH \\ \diagdown C \diagup \\ H_2C \quad CH-CO-R \\ | \quad\quad\quad | \\ R_1-C \quad CO \\ \diagup \quad \diagdown \\ R_2 \quad N \\ | \\ R_4 \end{array} \quad (I)$$

wherein $R_1$ represents a hydrocarbon radical,
$R_2$ represents a hydrocarbon radical which can also be bound with $R_1$ to form an alkylene radical having 4 to 7 carbon atoms,
$R_3$ represents a radical corresponding to the definition of $R_1$, in particular an alkyl, aryl or aralkyl radical,
$R_4$ represents hydrogen, and
R represents a propyl or a phenyl radical, may be isolated as intermediate products in a process comprising the steps of:

(a) condensing
(1) one mole of a 5-substituted isoxizale of the formula $$\begin{array}{c} O \\ \diagup \diagdown \\ R-C \quad N \\ \| \quad\quad \| \\ CH \text{---} CH \end{array} \quad (II)$$

wherein R has the meaning given above, in concentrated mineral acids such as concentrated sulfuric acid or polyphosphoric acid at low temperatures or in glacial acetic acid to which is added a slight amount of mineral acid, e.g. sulfuric acid at low temperatures, with (2) a compound which can be converted by means of a mineral acid into a carbonium ion of the formula $$\begin{array}{c} R_3 \\ | \\ CO \\ \diagup \\ R_1 \quad CH_2 \\ \diagdown | \\ C_+ \\ \diagup \\ R_2 \end{array} \quad (III)$$

wherein $R_1$, $R_2$ and $R_3$ have the meanings given above; and then (b) dehydrating the resulting intermediate of Formula I by means of concentrated mineral acid, preferably sulfuric acid at temperatures ranging from 15° to 30° C.

whereby an unsaturated pyridone of the formula $$\begin{array}{c} R_3 \\ | \\ C \\ \diagdown \\ H_2C \quad C-CO-R \\ | \quad\quad\quad \| \\ R_1-C \quad CO \\ \diagup \quad \diagdown \\ R_2 \quad N \\ | \\ R_4 \end{array} \quad (IV)$$

wherein $R_1$, $R_2$, $R_3$, $R_4$ and R have the meanings given above, is obtained.

However, if R is methyl, only unsaturated pyridones of Formula IV, but no corresponding intermediary 4-hydroxy derivative of Formula I can be obtained.

The object of our invention is to produce new compounds of the formula $$\begin{array}{c} R_3' \quad OH \\ \diagdown C \diagup \\ H_2C \quad CH-CO-CH_3 \\ | \quad\quad\quad | \\ R_1'-C \quad CO \\ \diagup \quad \diagdown \\ R_2' \quad N \\ | \\ R_4' \end{array} \quad (V)$$

wherein $R_1'$, $R_2'$ and $R_3'$ are identical or different lower alkyl radicals, preferably with maximally 5 carbon atoms each, and $R_4'$ is a lower alkyl or lower alkenyl radical, preferably with maximally 6 carbon atoms each, a dialkylamino-alkyl radical, a phenylalkyl or a phenylalkenyl radical, the alkyl and alkenyl groups of these radicals having at most three carbon atoms each, while the benzene ring of the two last-mentioned radicals can be substituted by at most three substituents taken from lower alkyl groups, preferably the methyl group, lower alkoxy groups, preferably the methoxy group, and/or halogen atoms, especially fluorine, chlorine or bromine, or by the methylenedioxy radical.

It has now surprisingly been found that this object can be attained and compounds of the Formula V, which are distinguished from the previous compounds of the Formula I by the group —CO—CH$_3$, and by the substituent at the nitrogen atom, can be obtained by a new process illustrated in the following reaction diagram:

$$\begin{array}{c} R_1' \\ \diagdown \\ C=CH-CO-R_3' + R_4'-NH_2 \quad \xrightarrow{(a)} \\ \diagup \\ R_2' \end{array}$$

(VI)  (VII)

$$\begin{array}{c} R_3' \\ | \\ CO \\ \diagup \\ H_2C \\ | \quad\quad + \text{diketene} \quad \xrightarrow{(b)} \\ R_1'-C \\ \diagup \quad \diagdown \\ R_2' \quad NH \\ | \\ R_4' \end{array}$$

(VIII)

second addition product $\xrightarrow{(c)}$ compound of Formula V (a) In the first reaction step one mole of an unsaturated ketone of the Formula VI is condensed at a temperature ranging from 0 to 30° C. preferably from 15 to 25° C., with from one mole to a slight excess thereover of a compound of the Formula VII, $R_1'$, $R_2'$, $R_3'$ and $R_4'$ having the meanings in Formulas VI and VII as given under Formula V.

(b) In the second step one mole of diketene is added gradually at a temperature ranging from about 0 to 30° C., preferably from 15 to 25° C., to each mole of the reaction product resulting from step (a).

(c) In the third step ring closure of the product obtained from step (b) is effected either during the addition of the diketene or by holding the temperature at 15 to 25° C. until the cyclization is complete which is the case within 5 to 60 minutes. If necessary the reaction is effected in the presence of a suitable basic condensing agent, preferably triethylamine.

(d) The resulting reaction mixture is then concentrated by evaporating the solvent in a rotary evaporator under sufficiently reduced pressure at a temperature not higher than 25° C., finally under high vacuum, and the residue is recrystallized from a suitable organic solvent, preferably from acetone.

The compounds of the Formula V have valuable pharmacological properties. They affect the central nervous system and have, in particular, analgetic, antipyretic, antiphlogistic and antitussive activity.

The following non-limitative examples illustrate the process according to the invention. The temperatures are in degrees centigrade.

*Example 1*

6.5 ml. ethylamine are added to 11.5 ml. mesityl oxide and the mixture is stirred for 20 minutes, slight heat being generated. 15 ml. triethylamine are added and, while cooling well, 8 ml. diketene are added dropwise at 20°. The reaction mixture is then stirred for 30 minutes without cooling and then evaporated in a rotary evaporator. The residue crystallizes from acetone whereupon 1-ethyl-3-acetyl-4-hydroxy-4,6,6 - trimethyl - 2 - piperidone is obtained which melts at 134–136°, (yield: 44% of theory).

*Example 2*

11.5 ml. mesityl oxide and 6.5 ml. ethylamine are left to stand together for 1 hour at 30°. 8 ml. diketene are then added dropwise at 20° while stirring, and the mixture is stirred for another 15 minutes. It is then evaporated in a rotary evaporator at 20 to 25°. On adding a little ether to the residue, a product crystallizes which is recrystallized from acetone. The 1-ethyl-3-acetyl-4-hydroxy-4,6,6-trimethyl-2-piperidone melts at 134 to 136°, (yield: 40% of theory).

*Example 3*

16.5 ml. propylamine and 23 ml. mesityl oxide are stirred with 15 ml. water for 1½ hours. This solution is added dropwise while stirring to 10 ml. diketene at a maximal temperature of 20°. The mixture is then immediately evaporated in a rotary evaporator at 20 to 25°, finally under high vacuum. A product crystallizes which is recrystallized from acetone. The 1-n-propyl-3-acetyl-4-hydroxy-4,6,6-trimethyl-2-piperidone melts at 108–110°, (yield: 35% of theory).

In an analogous manner as in the foregoing examples there are produced the 3-acetyl-4-hydroxy-4,6,6-trialkyl-piperidone derivatives of Formula V, whose substituents in 1-, 4- and 6,6-positions are listed below in the columns of Table I, entitled $R_1'$, $R_2'$, $R_3'$ and $R_4'$, respectively, and correspond to the substituents defined in the same manner in the starting materials of Formulas VI and VII.

TABLE 1

| Expl. | $R_1'$ | $R_2'$ | $R_3'$ | $R_4'$ |
|---|---|---|---|---|
| 4 | CH₃ | CH₃ | CH₃ | CH₃ |
| 5 | CH₃ | CH₃ | CH₃ | i-C₃H₇ |
| 6 | CH₃ | CH₃ | CH₃ | n-C₄H₉ |
| 7 | CH₃ | CH₃ | CH₃ | CH₂=CH—CH₂— |
| 8 | CH₃ | CH₃ | CH₃ | C₆H₅—CH₂=CH₂— |
| 9 | CH₃ | CH₃ | CH₃ | CH₃—C₆H₄—CH₂— |
| 10 | CH₃ | CH₃ | CH₃ | i-C₃H₇—C₆H₄—CH₂—CH₂— |
| 11 | CH₃ | CH₃ | CH₃ | C₆H₅—CH=CH—CH₂— |
| 12 | CH₃ | CH₃ | CH₃ | CH₃O—C₆H₄—CH₂—CH₂— |
| 13 | CH₃ | CH₃ | CH₃ | (Cl)C₆H₄—CH₂—CH₂— |
| 14 | CH₃ | CH₃ | CH₃ | F—C₆H₄—CH₂—CH₂— |
| 15 | CH₃ | CH₃ | CH₃ | Cl—C₆H₃(Cl)—CH₂—CH₂— |
| 16 | CH₃ | CH₃ | CH₃ | (CH₃)C₆H₄—CH₂—CH₂— |
| 17 | CH₃ | CH₃ | CH₃ | CH₃O—C₆H₃(CH₃—O)—CH₂—CH₂— |
| 18 | CH₃ | CH₃ | CH₃ | CH₃—O—C₆H₂(CH₃O)(CH₂—O)—CH₂—CH₂— |
| 19 | CH₃ | CH₃ | CH₃ | (CH₃)₂N—(CH₂)₃— |
| 20 | CH₃ | CH₃ | n-C₃H₇ | C₆H₃(Cl)—CH₂—CH₂— |

TABLE 1—Continued

| Expl. | $R_1'$ | $R_2'$ | $R_3'$ | $R_4'$ |
|---|---|---|---|---|
| 21 | $CH_3$ | $CH_3$ | $n\text{-}C_3H_7$ | Cl—C$_6$H$_4$—CH$_2$—CH$_2$— |
| 22 | $CH_3$ | $CH_3$ | $n\text{-}C_3H_7$ | (o-Br)C$_6$H$_4$—CH$_2$—CH$_2$— |
| 23 | $CH_3$ | $CH_3$ | $n\text{-}C_3H_7$ | (m-Br)C$_6$H$_4$—CH$_2$—CH$_2$— |
| 24 | $CH_3$ | $CH_3$ | $i\text{-}C_3H_7$ | $C_2H_5$ |
| 25 | $CH_3$ | $CH_3$ | $i\text{-}C_3H_7$ | Br—C$_6$H$_4$—CH$_2$—CH$_2$— |
| 26 | $CH_3$ | $CH_3$ | $i\text{-}C_3H_7$ | (CH$_3$)$_2$C$_6$H$_3$—CH$_2$—CH$_3$— |
| 27 | $CH_3$ | $CH_3$ | $i\text{-}C_3H_7$ | (CH$_3$)$_2$C$_6$H$_3$—CH$_2$—CH$_2$— |
| 28 | $CH_3$ | $CH_3$ | $i\text{-}C_3H_7$ | (CH$_3$)$_2$C$_6$H$_3$—CH$_2$—CH$_2$— |
| 29 | $CH_3$ | $CH_3$ | $n\text{-}C_4H_9$ | Cl$_2$C$_6$H$_3$—CH$_2$—CH$_2$— |
| 30 | $CH_3$ | $CH_3$ | $n\text{-}C_4H_9$ | C$_6$H$_5$—(CH$_2$)$_3$— |
| 31 | $CH_3$ | $CH_3$ | $n\text{-}C_4H_9$ | $(CH_3)_2N$—$CH_2$—$CH_2$— |
| 32 | $CH_3$ | $CH_3$ | $n\text{-}C_4H_9$ | $(C_2H_5)_2N$—$CH_2$—$CH_2$— |
| 33 | $CH_3$ | $CH_3$ | $n\text{-}C_4H_9$ | $(CH_3)_2N$—$CH_2$—$CH(CH_3)$—$CH_2$— |
| 34 | $CH_3$ | $CH_3$ | $n\text{-}C_4H_9$ | $CH_2=C(CH_3)$—$CH_2$— |
| 35 | $CH_3$ | $CH_3$ | $i\text{-}C_4H_9$ | (o-OCH$_3$)C$_6$H$_4$—CH$_2$—CH$_2$— |
| 36 | $CH_3$ | $CH_3$ | $t\text{-}C_4H_9$ | (methylenedioxy)C$_6$H$_3$—CH$_2$—CH$_2$— |
| 37 | $CH_3$ | $CH_3$ | $n\text{-}C_5H_{11}$ | $n\text{-}C_5H_{11}$ |
| 38 | $CH_3$ | $CH_3$ | $i\text{-}C_5H_{11}$ | $i\text{-}C_5H_{11}$ |
| 39 | $C_2H_5$ | $C_2H_5$ | $CH_3$ | $CH_3$—O—C$_6$H$_4$—CH$_2$— |
| 40 | $C_2H_5$ | $C_2H_5$ | $CH_3$ | (CH$_3$O)$_2$C$_6$H$_3$—CH$_2$— |
| 41 | $C_2H_5$ | $C_2H_5$ | $CH_3$ | (methylenedioxy)C$_6$H$_3$—CH$_2$— |
| 42 | $C_2H_5$ | $C_2H_5$ | $CH_3$ | $CH_3$—O—C$_6$H$_4$—CH$_2$—CH$_2$— |
| 43 | $C_2H_5$ | $C_2H_5$ | $CH_3$ | (m-CH$_3$O)C$_6$H$_4$—CH$_2$—CH$_2$— |

TABLE 1—Continued

| Expl. | R₁' | R₂' | R₃' | R₄' |
|---|---|---|---|---|
| 44 | C₂H₅ | C₂H₅ | CH₃ | CH₃—O—C₆H₃(OCH₃)—CH₂—CH₂— |
| 45 | n-C₃H₇ | n-C₃H₇ | CH₃ | C₆H₄(CH₃)—CH₂—CH₂— |
| 46 | n-C₃H₇ | n-C₃H₇ | CH₃ | CH₃—C₆H₄—CH₂—CH₂— |
| 47 | n-C₃H₇ | n-C₃H₇ | CH₃ | C₆H₄(F)—CH₂—CH₂— |
| 48 | n-C₃H₇ | n-C₃H₇ | CH₃ | C₆H₄(F)—CH₂—CH₂— |
| 49 | n-C₃H₇ | n-C₃H₇ | n-C₃H₇ | n-C₃H₇ |
| 50 | i-C₃H₇ | i-C₃H₇ | C₂H₅ | n-C₆H₁₃ |
| 51 | n-C₄H₉ | n-C₄H₉ | CH₃ | C₆H₄(Cl)—CH₂—CH₂— |
| 52 | i-C₄H₉ | CH₃ | CH₃ | i-C₄H₉ |
| 53 | t-C₄H₉ | CH₃ | CH₃ | t-C₄H₉ |
| 54 | i-C₅H₁₁ | CH₃ | CH₃ | CH₃—CH=CH—CH₂— |
| 55 | n-C₅H₁₁ | n-C₅H₁₁ | CH₃ | n-C₅H₁₁ |

To produce dosage units for peroral application, each unit containing preferably 100 mg. or 300 mg. of active substance of Formula V, the latter is combined e.g. with solid, pulverulent carriers such as lactose, saccharose, sorbitol, mannite; starches such as potato starch, corn starch or amylopectin, also laminaria powder or citrus pulp powder; cellulose derivatives or gelatine, also lubricants such as magnesium or calcium stearate or polyethylene glycols of waxy consistency (Carbowaxes) may be added to form tablets or dragée centres. The latter are coated, for example, with concentrated sugar solutions which, e.g. can contain gum arabic, talcum and/or titanium dioxide, or they are coated with a lacquer dissolved in easily volatile organic solvents or mixtures of organic solvents. Dyestuffs can be added to these coatings, for example, to distinguish between different contents of active substance. Soft gelatine capsules (pearl-shaped closed capsules) and other closed capsules consist, for example, of a mixture of gelatine and glycerine, and contain, e.g., mixtures of the active substance with Carbowax, and hard gelatine capsules contain, for example, granulates of the active substance with solid, pulverulent carriers such as, e.g., lactose, saccharose, sorbitol, mannite; starches such as potato starch, corn starch or amylopectin, cellulose derivatives or gelatine, as well as magnesium stearate or stearic acid. Suppositories are employed as dosage units for rectal application. These consist of a combination of the active substance with a neutral fatty base, or also gelatine rectal capsules can be employed which consist of a combination of the active substance with polyethylene glycols of waxy consistency (Carbowaxes).

Syrups or suspensions for peroral application consist, for example, of a solution containing at least about 2% and at most about 20% by weight of active substance, sugar and a mixture of ethanol, water and glycerine as well as propyleneglycol and, e.g., aroma, saccharine and/or carboxymethylcellulose (for suspension purpose).

The following non-limitative examples illustrate the production of typical forms of application of compounds according to the invention.

*Example I*

Manufacturing instructions for the production of a syrup containing 5% (weight per volume) of active substance of Formula I

| | | |
|---|---|---|
| Active substance | g | 5.0 |
| Saccharine | g | 0.6 |
| Sugar | g | 3.0 |
| Glycerine | g | 5.0 |
| Distilled water | g | 10.0 |
| Aroma | g | 0.1 |
| Ethanol 96% | ad ml | 100.0 |

Sugar and saccharine are dissolved in hot distilled water. On cooling, the solution is made up to weight with water and glycerine is added. The aqueous solution is poured into the solution of active substance and aroma in about 65 ml. ethanol and then made up to 100 ml. with ethanol.

*Example II*

Manufacturing instructions for the production of a suspension containing 5% (weight per volume) of active substance of Formula I

| | | |
|---|---|---|
| Active substance | g | 5.0 |
| Propyleneglycol | g | 4.5 |
| Carboxymethylcellulose | g | 0.3 |
| Sugar | g | 5.5 |
| Sorbic acid | g | 0.2 |
| Aroma | g | 0.1 |
| Ethanol 96% | g | 5.0 |
| Distilled water | ad ml | 100.0 |

Sugar and sorbic acid are dissolved in about 70 ml. boiling distilled water. The carboxymethylcellulose (CMC) is added to the hot solution which is allowed to cool to room temperature while being stirred slowly. The thoroughly ground active substance and propyleneglycol are made into a homogenous paste. Then the cooled CMC-slurry is added under continuous stirring. After the aroma has been dissolved in ethanol it is added to the mixture. This is made up to 100 ml. with distilled water.

What is claimed, is:
1. A process for the production of hydrogenated pyridones comprising
(a) condensing one mole of an unsaturated ketone of the formula

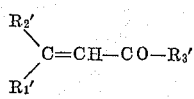

with from one mole to a slight excess thereover of a compound of the formula $R_4'NH_2$ in which formulas each of $R_1'$, $R_2'$ and $R_3'$ is, independently, alkyl with maximally 5 carbon atoms and $R_4'$ is a member selected from the group consisting of alkyl with maximally 6 carbon atoms, alkenyl of maximally 6 carbon atoms, dialkylaminoalkyl in which each alkyl has at most 3 carbon atoms, phenylalkyl in which alkyl has at most 3 carbon atoms and phenylalkenyl in which alkenyl has at most 3 carbon atoms, the benzene ring of the two last mentioned members being substituted with from 0 to 3 substituents selected from the group consisting of methyl, methoxy, fluorine, chlorine and bromine and from 0 to 1 methylenedioxy linked with the benzene ring to form a group of the formula

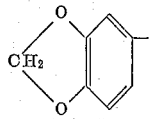

the reaction being carried out at a temperature ranging from 0 to 30° C.
(b) adding one mole of diketene gradually at a temperature ranging from about 0 to 30° C. to each mole of the resulting reaction product
(c) heating the reaction mass resulting from step (b) at a temperature ranging from 15 to 25° C. until the cyclization is complete thereby producing a compound of the formula

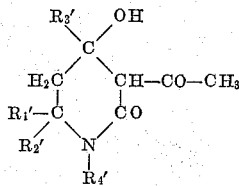

wherein $R_1'$, $R_2'$, $R_3'$ and $R_4'$ have the above meaning, and
(d) recovering the last mentioned compound.

2. A process as described in claim 1 wherein the temperature during step (a) ranges from about 15 to 25° C.
3. A process as described in claim 1 wherein the temperature during step (b) ranges from about 15 to 25° C.
4. A process as described in claim 1 wherein the time of treatment under step (c) ranges from about 0 to 60 minutes.
5. A compound of the formula

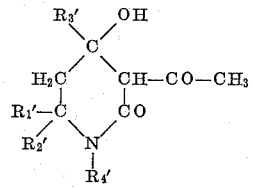

wherein each of $R_1'$, $R_2'$ and $R_3'$ is, independently, alkyl with maximally 5 carbon atoms and $R_4'$ is a member selected from the group consisting of alkyl with maximally 6 carbon atoms, alkenyl of maximally 6 carbon atoms, dialkylaminoalkyl in which each alkyl has at most 3 carbon atoms, phenylalkyl in which alkyl has at most 3 carbon atoms and phenylalkenyl in which alkenyl has at most 3 carbon atoms, the benzene ring of the two last mentioned members being substituted with from 0 to 3 substituents selected from the group consisting of methyl, methoxy, fluorine, chlorine and bromine and from 0 to 1 methylenedioxy linked with the benzene ring to form a group of the formula

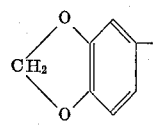

6. 1,4,6,6 - tetramethyl - 3 - acetyl - 4 - hydroxy - 2-piperidone.
7. 1 - ethyl - 3 - acetyl - 4 - hydroxy - 4,6,6 - trimethyl-6-piperidone.
8. 1 - n - propyl - 3 - acetyl - 4 - hydroxy - 4,6,6 - trimethyl-2-piperidone.
9. 1 - allyl - 3 - acetyl - 4 - hydroxy - 4,6,6 - trimethyl-2-piperidone.
10. 1 - β - phenylethyl - 3 - acetyl - 4 - hydroxy - 4,6,6-trimethyl-2-piperidone.

References Cited in the file of this patent
UNITED STATES PATENTS

| | | |
|---|---|---|
| 2,807,585 | Gardner et al. | Sept. 24, 1957 |
| 2,999,096 | Schlesinger et al. | Sept. 5, 1961 |
| 3,004,889 | Kuna et al. | Oct. 17, 1961 |
| 3,024,166 | Kuna et al. | Mar. 6, 1962 |
| 3,037,986 | Langis | June 5, 1962 |